United States Patent
Nicolas et al.

[15] 3,662,385
[45] May 9, 1972

[54] RAPID SCANNING ECHO DETECTOR

[72] Inventors: Michel Jacques Robert Nicolas, Paris; Claude Marius Pirolli, Saint-Denis, both of France

[73] Assignee: Societe Nationale D'Etude et de Construction de Moteurs D'Aviation, Paris, France

[22] Filed: Feb. 16, 1970

[21] Appl. No.: 11,693

[30] Foreign Application Priority Data

Feb. 19, 1969 France..................................6904191

[52] U.S. Cl..........................343/10, 343/100 SA, 343/854
[51] Int. Cl.............................................................G01s 9/04
[58] Field of Search..............................343/10, 100 SA, 854

[56] References Cited

UNITED STATES PATENTS

| | | | |
|---|---|---|---|
| 3,413,633 | 11/1968 | Lehmann.................................343/10 |
| 3,487,408 | 12/1969 | Clarke......................343/100 SA UX |
| 3,509,566 | 4/1970 | Vorie.......................................343/10 |

Primary Examiner—T. H. Tubbesing
Attorney—Brufsky, Staas, Breiner and Halsey

[57] ABSTRACT

A radar system or other echo detection system is disclosed in which a transmitting antenna array and a receiving antenna array are utilized, the transmitting array having a plurality $p$ or antenna elements, or radiators, and the receiving array having a plurality $n$ of antenna elements which may be different in number from the number of antenna elements in the transmitting array, and each array having respective signal channels. The transmitting and receiving arrays are rapidly and simultaneously scanned by an electronic scanning technique in which the reception range is scanned within the duration of the transmission pulse. According to the present disclosure, this is accomplished by the steps of feeding respective frequencies differing by a constant increment $f_r$ to successive elemental antenna channels of the receiving array and feeding respective frequencies differing by another constant increment $f_e$ to successive elemental antenna channels of the transmitting array, wherein the increment $f_r$ between frequencies fed to the receiving antenna elements is greater than or equal to the product of the increment $f_e$ between frequencies fed to the transmitting antenna elements and the number $p$ of antenna elements in the transmitting array, i.e., $f_r \geq p \cdot f_e$.

10 Claims, 5 Drawing Figures

FIG.:5

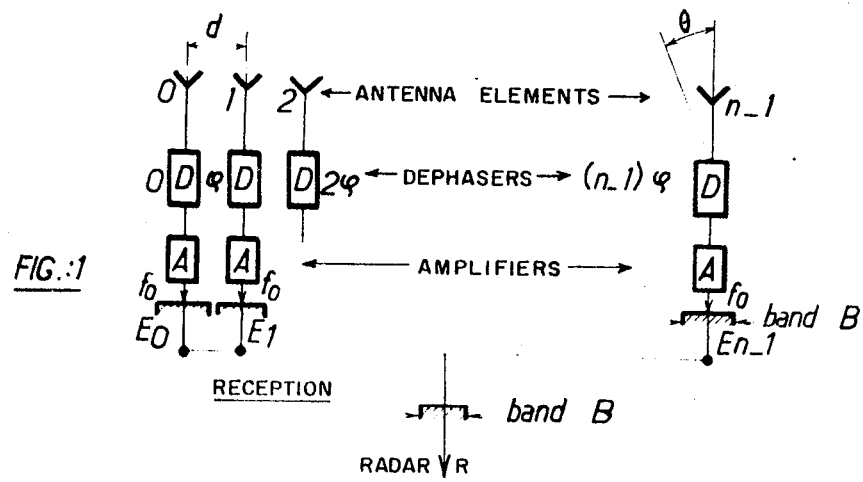
FIG.:1
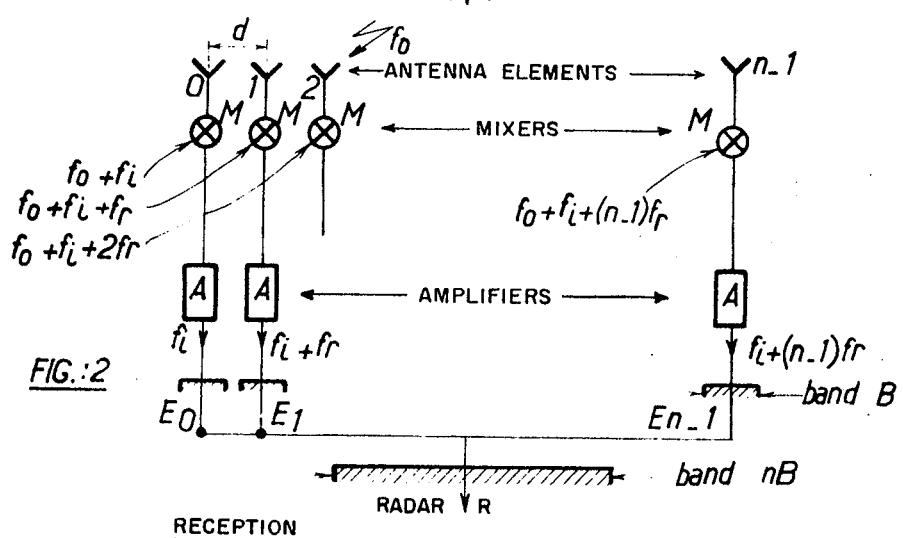
FIG.:2
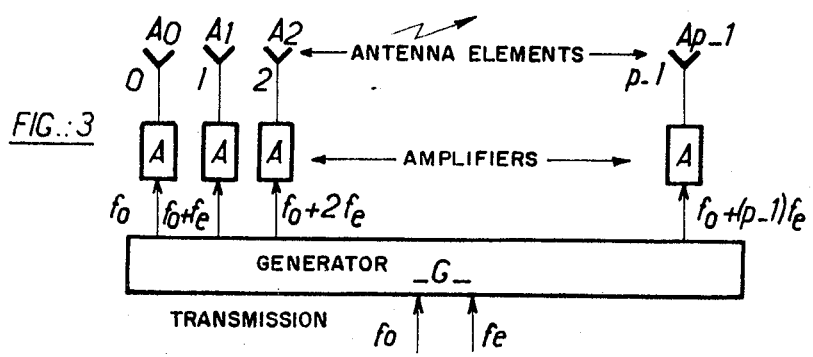
FIG.:3

RAPID SCANNING ECHO DETECTOR

BACKGROUND OF THE INVENTION

1. Field of the Invention

The present invention relates generally to echo detection systems, and more particularly to radar systems in which a transmitting array of antenna elements and a receiving array of antenna elements are simultaneously subjected to beam positioning using rapid electronic scanning techniques.

2. Prior Art

It has been proposed to improve the reception of Hertzian signals of a known bandwidth in a radio signal echo detection system, where these signals come from different, unknown directions, by sampling the incoming signals with a rapidly scanning beam of a receiving antenna in a multiple element linear system. Such proposals may be found, for example, in the disclosures of U.S. Pat. No. 2,426,460, issued Aug. 26, 1947, to H. M. Lewis, and No. 3,012,244, issued Dec. 5, 1961, to D. F. Langenwalter et al. In order to attain this improved reception, differing fixed values of frequencies $f_r$ were introduced into the channels of successive antenna elements, that is to say, frequencies of a progressive arithmetic ratio $f_r$. This fixed increase in the frequencies introduced into the channels of successive antenna elements will hereinafter be referred to by the term "increment".

SUMMARY OF THE INVENTION

The present invention takes advantage of the aforementioned principle of rapid scanning of a receiving antenna from the prior art, in conjunction with a transposition of the principle to the rapid scanning of a transmitting antenna of the same echo detection system. By virtue of the invention, The association of rapid scanning in transmission as well as in reception results in the realization of a radar or sonar system that is both efficient and economical, utilizing the techniques of so-called "within-pulse scanning."

According to the present invention, the increment of frequency reception $f_r$ is chosen in accordance with Shannon's sampling theorem, in terms of the characteristics of the transmitted signals; that is to say, in terms of the parameters of the transmitting network of the echo detection system. More particularly, the selected parameters of the transmitting network are the number $p$ of antenna elements (or, what is the same thing, elemental antennas) of the transmitting antenna array (and it is to be observed that this number of antennas elements may be different from $n$, the number of antenna elements in the receiving antenna array), and the increment of frequency $f_e$ used in the transmitting array. The relationship between $f_r$ and $f_e$ is as follows:

$$f_r \geq p \cdot f_e,$$

of which the most straightforward solution is clearly $$f_r = p \cdot f_e.$$

This relationship between the two scanning frequency increments, that is, for the transmitting and receiving networks of the echo detection system, permits the gathering of angular measurements in terms of time measurements, and the separate extraction of information regarding distance and angle of the target, i.e., the object (or objects) from which the transmitted pulses are reflected.

BRIEF DESCRIPTION OF THE DRAWINGS

The above and still further objects, features, and advantages of the present invention will become apparent from a consideration of the following detailed description of a preferred embodiment, with reference to the accompanying figures of drawings, in which:

FIG. 1 is a simplified schematic diagram of a phase control antenna system in which the present invention is utilized;

FIG. 2 is a schematic diagram of a modification of the system of FIG. 1 according to the present invention;

FIG. 3 is a schematic diagram of a rapid scanning network employed in the echo detection system of this invention;

DESCRIPTION OF THE PREFERRED EMBODIMENT

Figure 4:
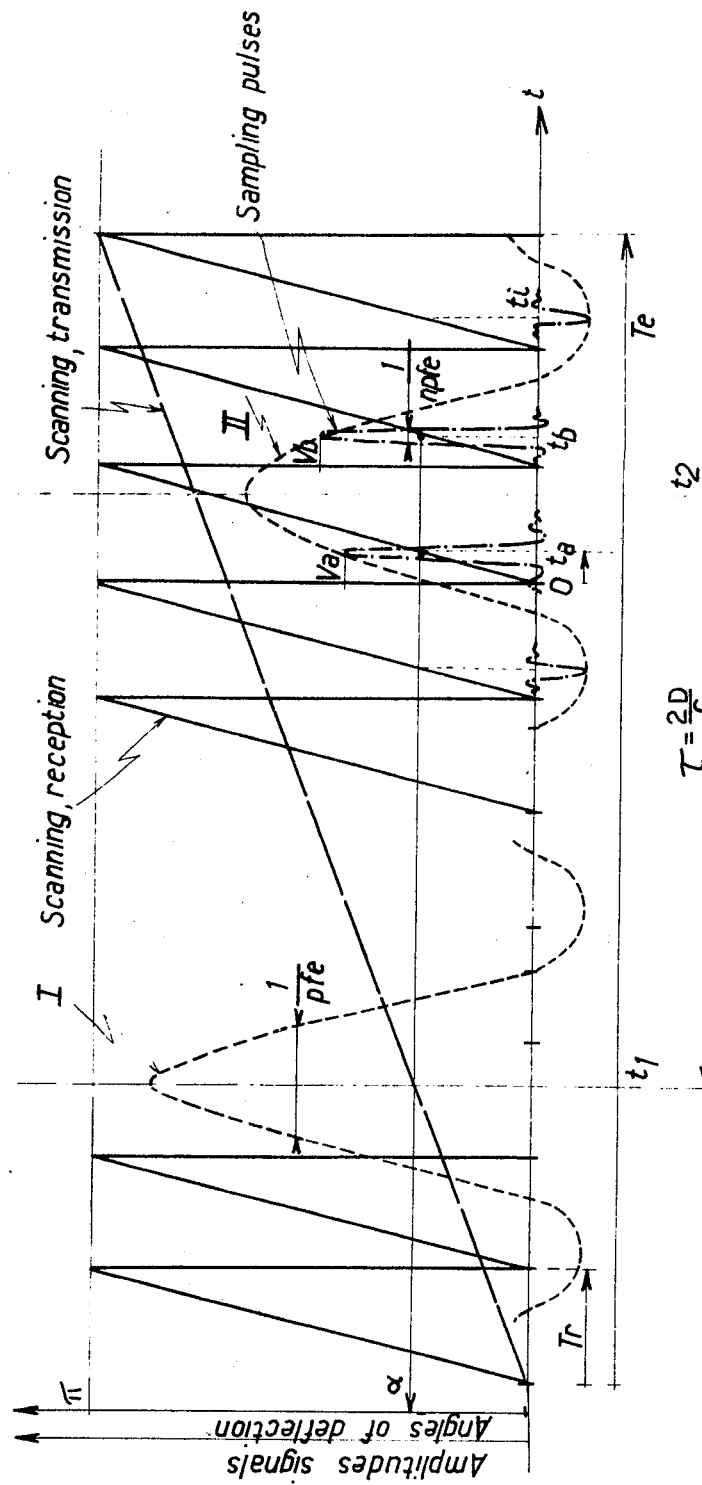
FIG. 4 is a chart useful in illustrating the manner in which angle and distance information is extracted by means of the present echo detection system.

Referring now to FIG. 1, there is shown in schematic diagrammatic form a receiving network of a radar system, with $n$ antenna elements evenly distributed according to a pitch or distance $d$ and associated with respective phase-shifters D for detection, the phase shifters increasing linearly according to a phase increment $\phi$. The dephasers D feed to the radar proper R through respective amplifiers A. If $\theta$ is the angle between the antenna axis and an incident wave of wave length $\lambda$, it may readily be demonstrated that the lobe of the antenna has the form of a transformed curve of Fourier's law for signals $E_0, E_1, \ldots, E_n$ and that the training direction is $$\sin \theta = (\lambda/2\pi d) \phi.$$

The desired relationship for space scanning can be achieved by suitably choosing the variations of $\phi$ in terms of time. The realization and operation of the system are particularly simple if the linear relationship $\phi = \omega_r t$ is adopted, where $\omega_r = 2\pi f_r$ and $f_r$ is defined below. In order to obtain this result, the arrangement shown in FIG. 1 is modified as shown in FIG. 2. Referring to the latter figure, a frequency change is introduced by mixers M utilizing local generators of differing frequencies of a fixed quantity $f_r$ between successive channels. In this manner, the array regularly scans the angular sector included between two principal, successive lobes within the period $$T_r = \frac{2\pi}{\omega_r} = \frac{1}{f_r} \qquad (1)$$

and, in reception, creates a train of periodic impulses.

If $d \leq \lambda/2$, the principal lobe describes a sector $\theta/\pi$ during this period $T_r$, and the following relation exists:

$$\sin \theta = 2f_r t \quad (\text{for } d = \lambda/2) \qquad (2)$$

If the increase in the speed of scanning compensates exactly for the widening (enlarging) of the lobe of the antenna in deflection, then the time of passage of the lobe in the direction $\theta$ of the transmitter, and more generally the form of the impulse which is received, are independent of that direction. The signals that are received are thus exactly the same as if the whole system, trained along the normal to the plane of the array, were turned around its center and at the angular speed:

$$\Omega = \frac{d\theta}{dt} = \frac{\omega_r}{\pi} = 2f_r \qquad (3)$$

In particular, no matter what the direction of the transmitter might be, if the illumination is uniform, the width at the half-power points of the received impulse is observed to be:

$$\tau_{3db} = T_r/n \qquad (4)$$

The analysis of the operation makes it evident that the spectrum of the received signal is a spectrum of coherent lines, distributed at regular intervals $f_r$ and occupying the breadth of the total band $nf_r$. Clearly, the process which has been described remains usable in the presence of several transmitters which are situated in different (and unknown) directions and which radiate toward the system receiving array any signals of known bandwidth B.

Shannon's sampling theorem indicates that the minimal frequency of space scanning, and as a consequence the increment of frequency between successive local oscillators, (and hence, channels), is precisely $f_r = B$. The movement of the lobe of the antenna array leads to a multiplexing of signals in time. It is thus easy to discriminate between these signals, to reconstitute them by filtering of the samples in a rectangular passband filter of width B, and, eventually, to determine the direction of the transmitters. The overall characteristics of this reception are entirely determined by the filter which is placed in each of the network channels. In particular, the reception may be optimal if the filter is matched to the signal utilized.

The particular case of the reception of pulse signals serves to illustrate these properties. With reference again to FIG. 2 and, for the sake of simplification, assuming a uniform weighting ($E_1 = E_2, \ldots, E_n$), let the incident signal consist of pulses of a rectangular spectrum of width B. These pulses have a spectrum having the form of a (sin $kt$)/$kt$ curve, with a width between zeros of $\theta_{00} = 2/B$.

The resulting signal applied to the radar R possesses a rectangular spectrum, made up of $n$ joined spectras of width B. The sampling pulse thus has a width between zeros of $\tau_{00} = \theta_{00}/n$ and since the scanning period is $T_r = 1/B$, the long pulse is sampled twice in its principal lobe and once in each of its secondary lobes. A scanning of sector $\theta/\pi$ "within-pulse" is thus accomplished and it is evident that no incident pulse can escape this analysis, regardless of the direction of the transmitting object. For a discussion of the technique of within-pulse scanning, see Davies, "Application of Electronic Sector Scanning Techniques to Height-Finding Radar Systems," Proc. I.E.E., vol. 110, No. 11, Nov., 1963; see, also, Davies, "Beam-Positioning Radar Systems Utilizing Continuous Scanning Techniques," Proc. I.E.E., vol. 112, No. 3, March, 1965.

It will be observed that this manner of proceeding presents the appreciable advantage that the signal-to-noise ratio of reception is entirely equivalent to that of matched filtering, and that consequently everything takes place, in this regard, as if the array were pointed in the direction of the incident wave, and the reception has taken place in a matched filter of width B with the same noise factor common to all channels.

FIG. 3 illustrates the application of rapid scanning in transmission by a transmitting antenna having $p$ elements radiating respectively at power levels obtained via amplifiers A and receiving differing frequencies at increments $f_e$ derived from a generator of coherent oscillations G. Using this arrangement, it is possible to periodically illuminate an object which is situated in a fixed direction relative to the transmitter. The signal that is received by the object has the form of Fourier's transformed curve from the spectrum of the transmitted coherent rays ($A_o, A_1, \ldots, A_{p-1}$). The phase and amplitude adjustment of this illumination (realizable by filtering at a low level) thus assures control of the form of the transmitted pulses. The recurrence frequency of the pulses is equal to the frequency interval $f_e$ between successive lines (rays).

More particularly, it can be said that it is the movement of the lobe of the antenna array which generates the signal; i.e., the object receives a maximum of energy at the moment of the passage of the lobe of the array in its direction and in the form of a pulse which retraces the diagram of radiation. Although each of the $p$ transmitting elements of the network operates continuously, the entire array acts as a pulse transmitter and permits distance measurements to be obtained.

The above-described process offers the following appreciable advantages:

a. the possibility of transmitting pulse signals (and consequently of measuring distances) with the aid of supporting wave oscillators;

b. the dual advantage with regard to the power; viz., on the one hand, the power to transmit is distributed among $p$ transmitters; on the other hand, if that which takes place in the range $\theta/\pi$ is examined in its entirety, the power (continually furnished by the transmitters) is utilized integrally, whereby to obtain a gain similar to that of a pulse compression ratio of $p$;

c. the possibility of controlling the form of pulses by a low level medium frequency filtering of the envelope of the transmitted spectrum; and d. the absence of dissipating phase-shifter circuits.

In accordance with the present invention, recourse is had simultaneously to the transmission and to the reception— using the principle of rapid scanning, which necessitates that the scanning reception frequencies increment $f_r$ be chosen according to Shannon's theory, in terms of the characteristics of the transmitted signal, that is to say, in terms of the parameters of the transmitting network, viz.:

$$f_r \geq p \cdot f_e,$$

wherein the choice $f_r = p \cdot f_e$ simplifies the solution. This fixed relation between the two scanning frequency increments allows the collection of angular and time measurements and the separate extraction of angle and distance data, following a very simple and unambiguous process which will be described presently with reference to FIG. 4. At the same time, it should be noted that an association of the networks schematically represented in FIGS. 2 and 3 permits the construction of a radar which employs both the properties of the associations of transmitting antenna elements and those of within-pulse scanning which, moreover, is necessitated by the recourse to rapid scanning in transmission. In fact, if the reception lobe were to follow the same movement as the transmission lobe, recurrence could only be analyzed for each angular quantum. On the contrary, if sufficiently rapid reception scanning is adopted, all the directions may be analyzed for each distance quantum and no pulse can escape the sampling.

If $B = p \cdot f_e$ is the frequency band of the transmitted signal, the reception scanning frequency must be: $f_r = p \cdot f_e$, or $p$ times the transmission scanning frequency.

As is shown in FIG. 4, when the width at the half power points of the transmitted pulse is close to $1/p \cdot f_e$, that of the sample pulse is $n$ times weaker. It happens, moreover, that the two principles (association of transmitting antenna elements and within-pulse scanning) are complementary. In fact, scanning essentially does away with the need to leave the antenna oriented during at least one recurrence in each direction, even in the case of signal-to-noise ratio consonant with a single pulse. The principle is therefore consistent with a more powerful transmission.

In such a radar, the angle and distance measurements are collected simply through time measurements, as is evident from FIG. 4. The scanning relationships are shown there, for simplicity, by straight lines. Assume that a target is located in direction $\alpha$ and at a distance D. The lobe of the transmitting antenna is pointed in the direction $\alpha$ at the instant $t_1$. The target receives a pulse having waveform I (diagram of the transmitting antenna). The relected wave appears at the instant $t_2 = t_1 + 2D/c$ and would produce a signal having waveform II (passage of pulse I in a matched filter) if the receiving antenna were omni-directional. In fact, the signal only appears at the adder output when the receiving array is in the direction $\alpha$, that is to say, at the sampling instants $t_a, t_b, \ldots, t_i$.

The measurement of any one of these instants $t_a$, beginning with the origin of the corresponding scanning O, directly supplies the bearing $\alpha$ since the scanning law is known (see equation 2, above). The distance measurement ($\tau = 2D/c$) demands the reconstitution of the received pulse waveform II, beginning with its samplings in order to fully utilize the precision of the system. Once this is achieved, the distance is immediately determined from the measurement of the interval $t_2 - t_1$.

Figure 5:
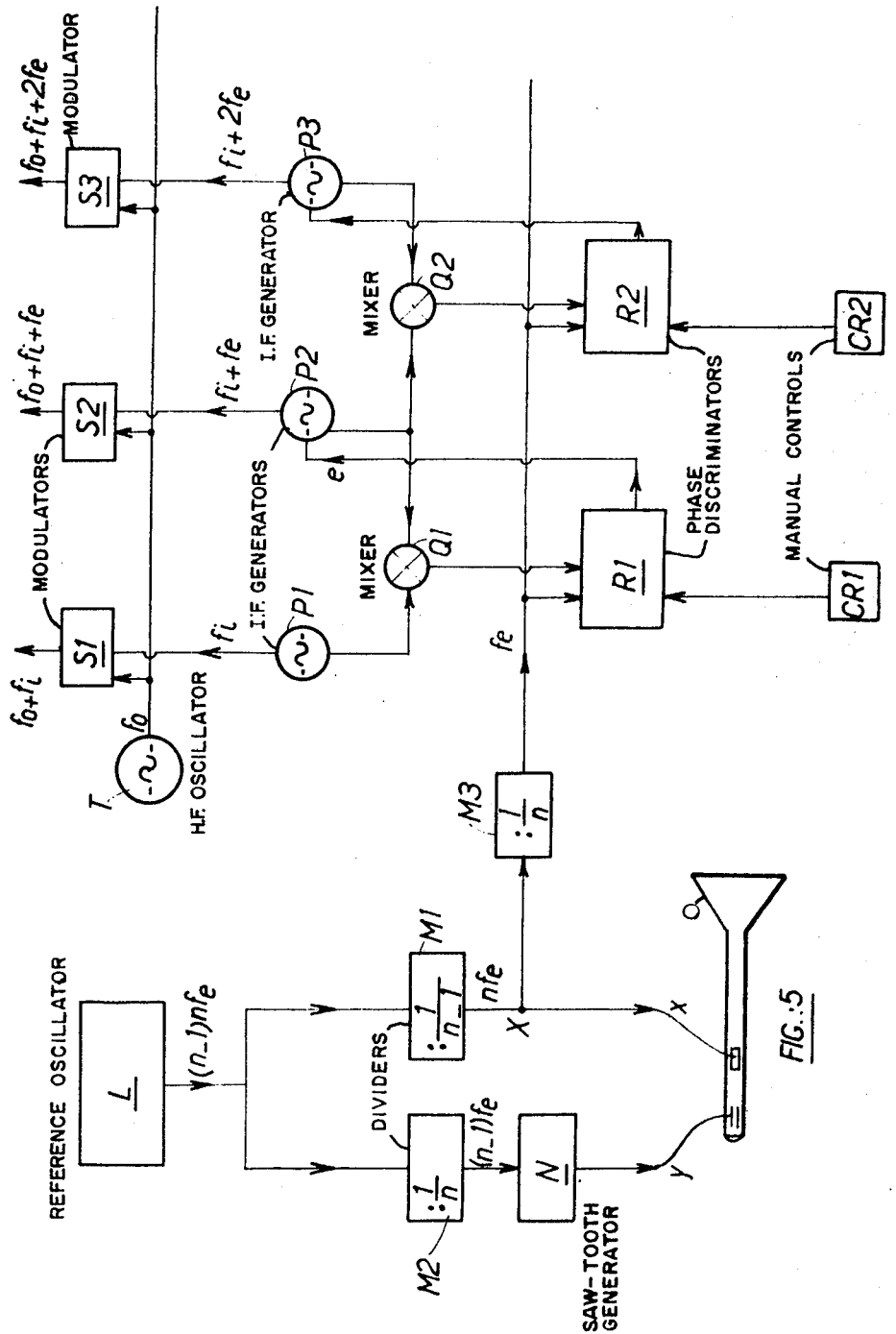
FIG. 5 is a detailed schematic diagram of exemplary circuitry in the system in which a display is utilized for simultaneously indicating angle and distance information.

These measurements are produced visually with the aid of a display that is schematically shown in FIG. 5. A frequency reference oscillator $(n-1) \cdot n \cdot f_e$, designated by L, supplies an output to a divider M1 causing a division through $n-1$, and also to a second divider M2 causing a division through $n$. The latter divider M2 supplies a generator N with sawtooth signals. In this manner, a first output $x$ is obtained for use in the horizontal synchronization of an oscilloscope O whose beam is modulated by the received signal. This permits the visualization of the angle measurement at the abscissa position on a screen. Likewise, the sawtooth signal $(n-1)f$ is supplied to generator N to produce the second output y, which is displayed on the vertical plates of the oscilloscope. The latter permits the observation of the distance measurement on a screen. Thus, the angle and distance measurements are obtained simultaneously and directly.

Moreover, it will be shown that it is easy to obtain the frequency signal $f_e$, previously defined with regard to FIG. 3, by a simple tapping at point X and division by $n$ in a divider M3. It is to be noted that this result, obtained from the oscillator L through successive divisions by $n-1$ and by $n$, assures good stability in the standard frequency $f_e$.

The coherent oscillations necessary for the transmissions are obtained from generators P1, P2, P3, . . . , of intermediate frequency $f_i$, controlled by differing crystal oscillators of the desired increment $f_e$. Each generator is phase-controlled relative to the preceding one by the beat frequency, obtained with the aid of mixers such as Q1, between two successive oscillators such as P1, P2. The output signal of each mixer is compared in a phase selector, such as R1, under manual control of CR1, for the standard signal $f_e$. The error signal $e$ coming from the selector such as R1 is applied to the oscillator P2.

The oscillators P1, P2, P3, . . . . . . deliver the differing respective frequencies of fixed values $f_e$, to the stages S1, S2, S3, . . , at the same time as a high frequency $f_o$ from oscillator T. In these stages, the final modulation of frequency $f_o$ and the amplification of the modulated signal for each of the channels are assured. The transposition to high frequency of the oscillation on each of these channels is accomplished by single sideband techniques.

Of course, the preceding explanation regarding the transmitting network can be entirely applied to the receiving network.

While we have disclosed a preferred embodiment of our invention, it will be apparent to those of ordinary skill in the art to which our invention pertains from a consideration of the foregoing description, that variations and modifications in the structure and operation which have been described may be resorted to without departing from the spirit and scope of the invention.

We claim as our invention:

1. A rapid electronic scanning process for a radar system having a transmitting antenna array and a receiving antenna array, each array consisting of a plurality of antenna elements, said process comprising the steps of:

applying signals of respective frequencies differing by a constant increment $f_r$ to successive feed channels, respectively, of said receiving array, and simultaneously with the application of the first-named signals to said channels of said receiving array, applying further signals of respective frequencies differing by another constant increment $f_e$ to successive feed channels, respectively, of said transmitting array, wherein the increment $f_r$ is selected to be at least equal to the product of the increment $f_e$ and the number of antenna elements in said transmitting array.

2. The process according to claim 1 wherein each of said frequencies is increased by the respective increment for said successive channels.

3. The process according to claim 1 wherein said increment $f_r$ is selected to be greater than said product.

4. The process according to claim 1 wherein both of said frequency-inserting means are operated simultaneously.

5. The process according to claim 1 wherein said frequencies are successively increased by the respective increment for insertion into the successive channels, respectively.

6. A rapid scanning radar system, comprising a transmitting antenna array consisting of p antenna elements, a receiving antenna array consisting of n antenna elements, a set of feed channels respectively associated with said antenna elements of said transmitting array, a set of signal processing channels respectively associated with said antenna elements of said receiving array, means for inserting respective frequencies differing by a predetermined frequency increment $f_e$ into respective channels associated with successive ones of said antenna elements of said transmitting array, and means for inserting respective frequencies differing by a predetermined frequency increment $f_r$ different from said increment $f_e$ into respective channels associated with successive ones of said antenna elements of said receiving array, said increment $f_r$ having a value $$f_r \geq p \cdot f_e.$$

7. The radar system according to claim 6 wherein the number of antenna elements in said receiving array is different from the number of antenna elements in said transmitting array.

8. The system according to claim 6 wherein $n = p$.

9. The system according to claim 6 further including means responsive to pulses reflected from an object illuminated by the scanning transmitting array, as received by said receiving array, for displaying the angle and distance of said object with reference to said arrays.

10. The system according to claim 9 wherein said display means includes cathode ray tube means, means for producing sawtooth waves of respective frequencies $nf_e$ and $(n-1)f_e$, synchronized with the scanning of said receiving array, and means for applying said frequencies $nf_e$ and $(n-1)f_e$ to the horizontal and vertical plates, respectively, of said cathode ray tube means, $n$ being the number of antenna array.

* * * * *